United States Patent [19]

Forsyth et al.

[11] 4,286,672
[45] Sep. 1, 1981

[54] REARWARDLY FOLDING AGRICULTURAL IMPLEMENT WITH EXTENDABLE TRANSPORT WHEELS

[75] Inventors: Clark H. Forsyth, Burlington; Anton H. G. Van Hooydonk, St. Catharines; Harold D. Ralph, Hamilton, all of Canada

[73] Assignee: International Harvester Company, Chicago, Ill.

[21] Appl. No.: 141,449

[22] Filed: Apr. 18, 1980

[51] Int. Cl.³ ............................................. A01B 73/00
[52] U.S. Cl. ................................. 172/311; 172/383; 172/421; 172/456
[58] Field of Search ............... 172/240, 310, 311, 383, 172/386, 421, 456, 662; 280/411 R, 411 A, 411 B, 411 C, 412, 413, 634, 656; 56/228, 385

[56] References Cited

U.S. PATENT DOCUMENTS

| | | | |
|---|---|---|---|
| 2,973,818 | 3/1961 | Marvin | 172/456 |
| 2,974,737 | 3/1961 | Dlugosch | 172/456 |
| 3,086,598 | 4/1963 | Gellner | 172/456 |
| 3,091,296 | 5/1963 | Lohrman et al. | 172/456 |
| 3,700,040 | 10/1972 | Sosalla et al. | 172/311 |
| 3,874,459 | 4/1975 | Herberholz | 172/311 |
| 4,058,172 | 11/1977 | Blair et al. | 172/311 |

FOREIGN PATENT DOCUMENTS

| | | | |
|---|---|---|---|
| 2440655 | 3/1976 | Fed. Rep. of Germany | 172/456 |
| 426612 | 11/1974 | U.S.S.R. | 172/311 |

Primary Examiner—Richard T. Stouffer
Attorney, Agent, or Firm—James J. Getchius; Neal C. Johnson; F. David AuBuchon

[57] ABSTRACT

An implement that includes a central subframe, a center frame, a pair of wing frames pivotally connected to the ends of the center frame for movement between a transversely aligned operating position and a rearwardly folded transport position, and a set of extendable transport wheels mounted on the rear end of the subframe generally adjacent the wing transport wheels, wherein the noted transport wheels provide the sole ground contact of the implement during transport for desirable handling characteristics.

9 Claims, 8 Drawing Figures

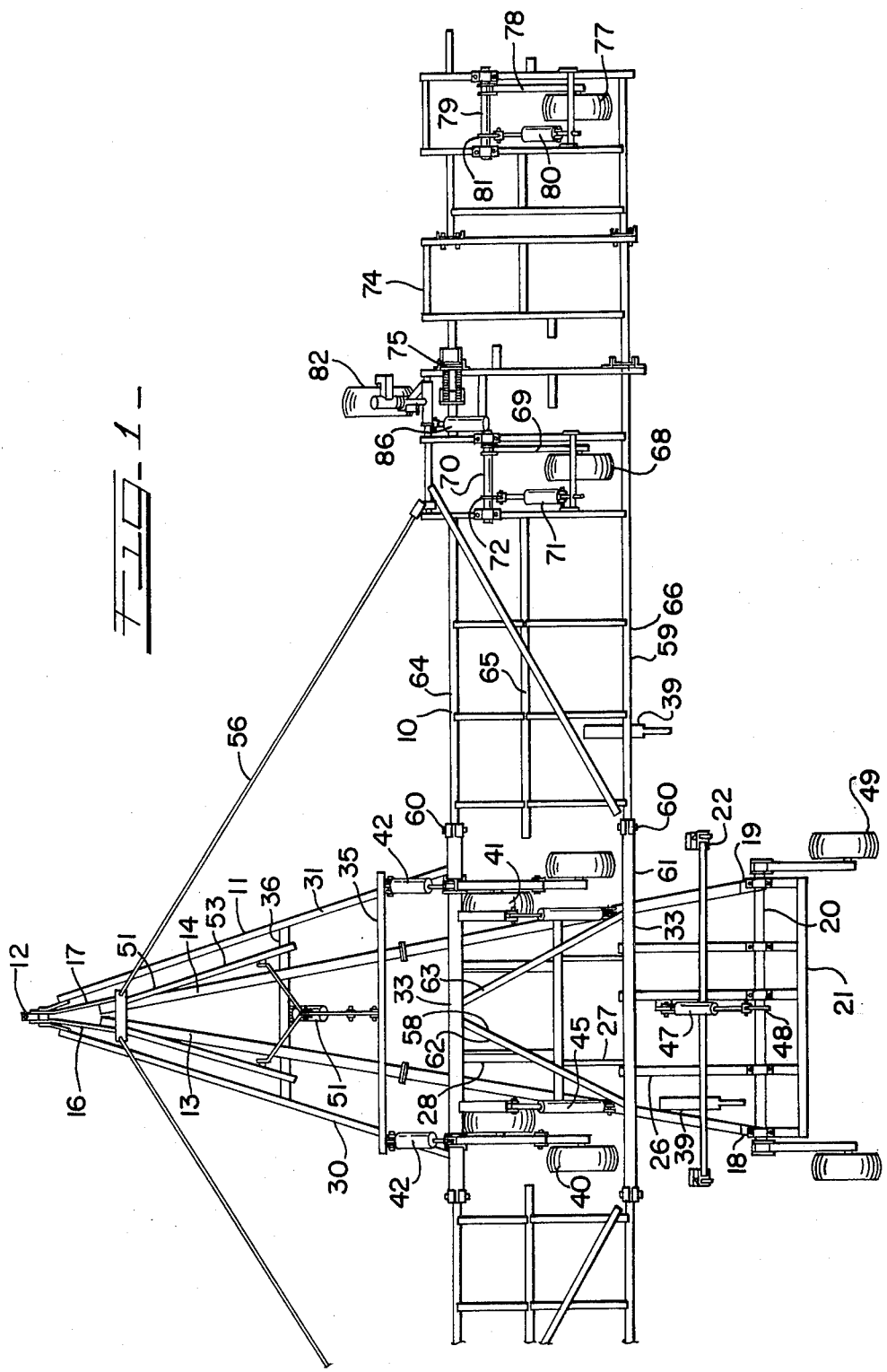

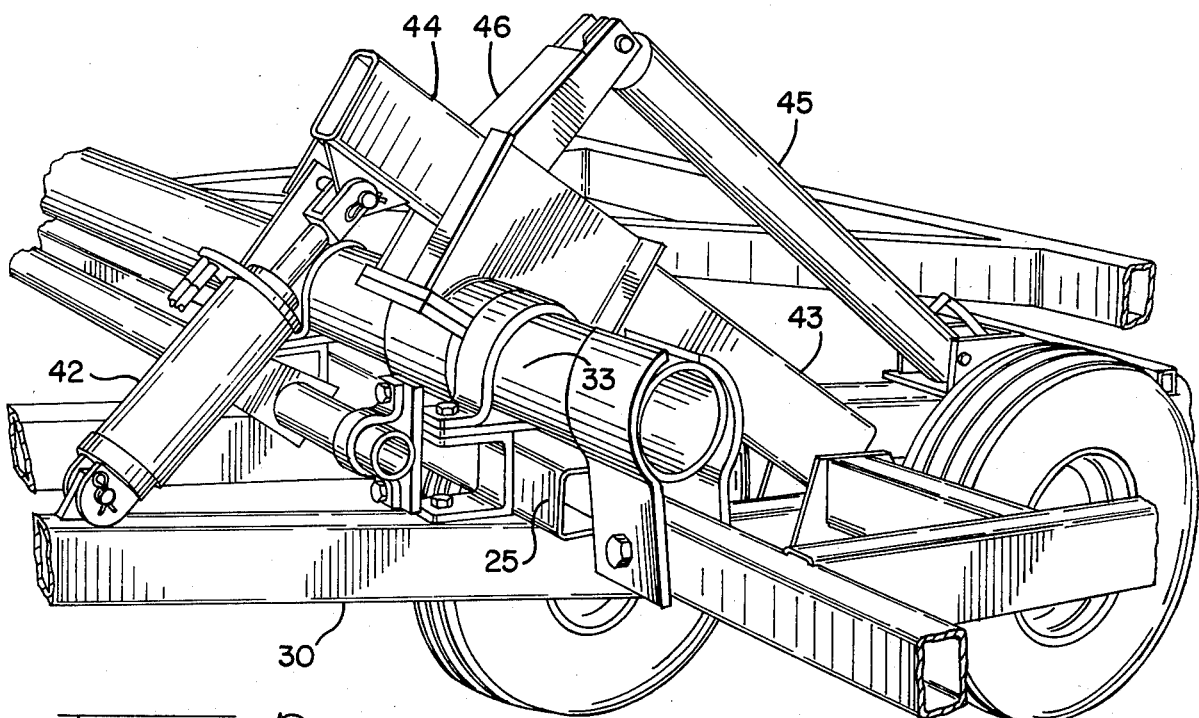
FIG_2_
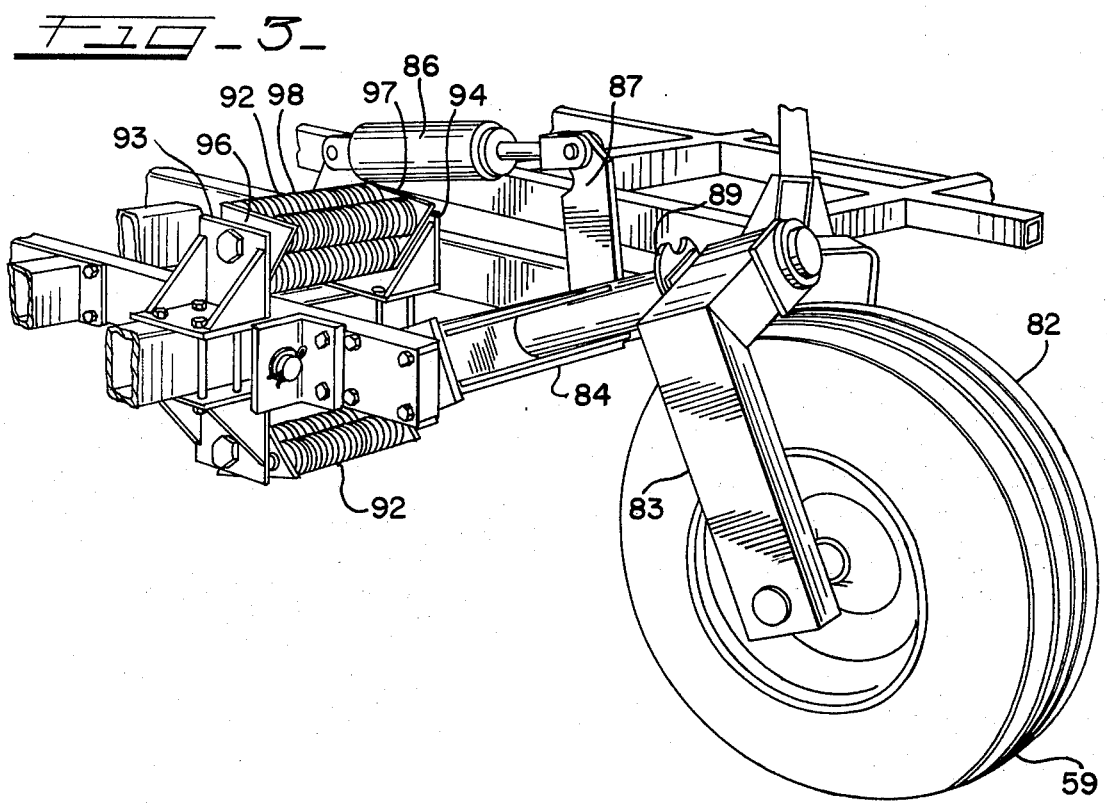
FIG_3_

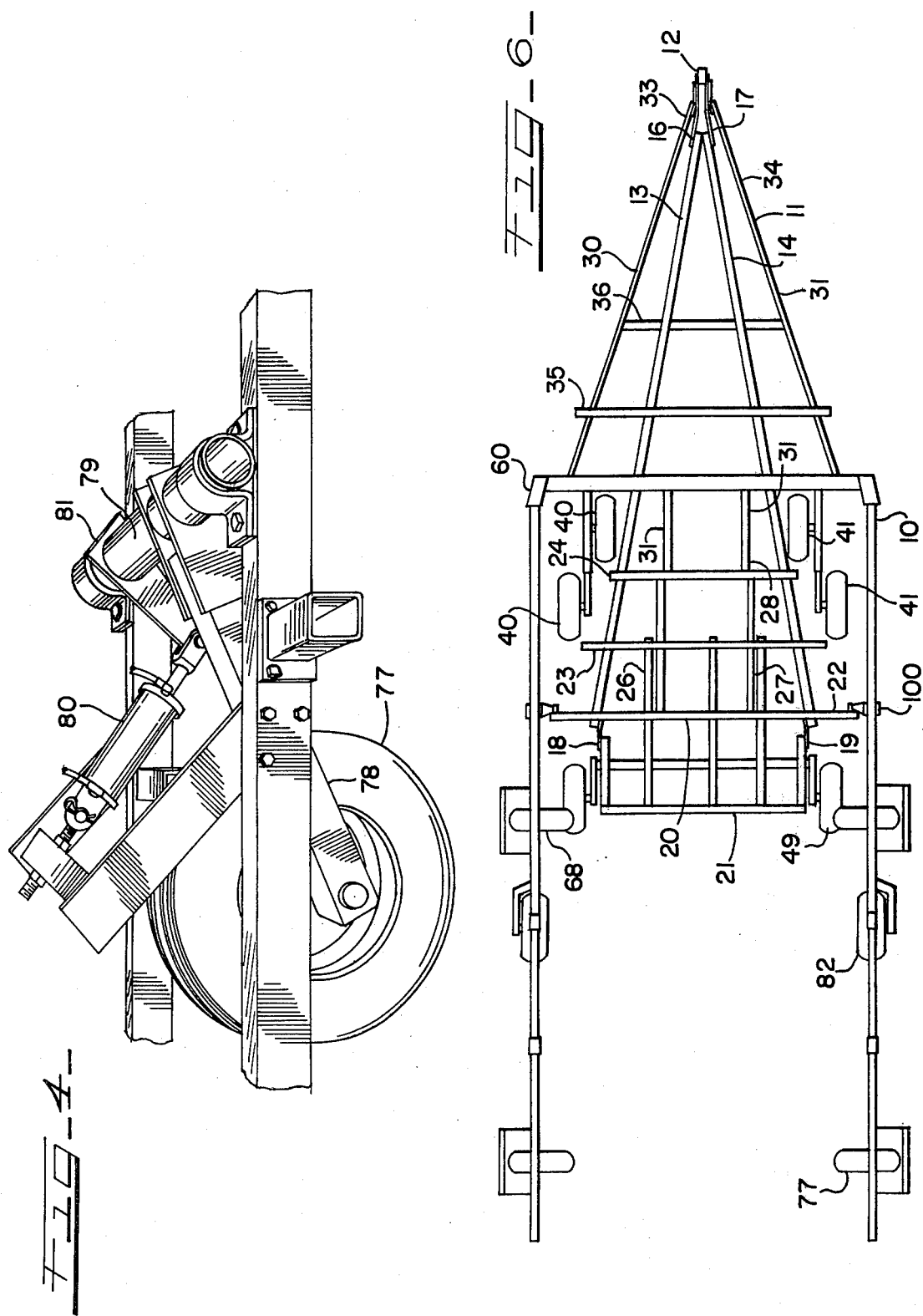

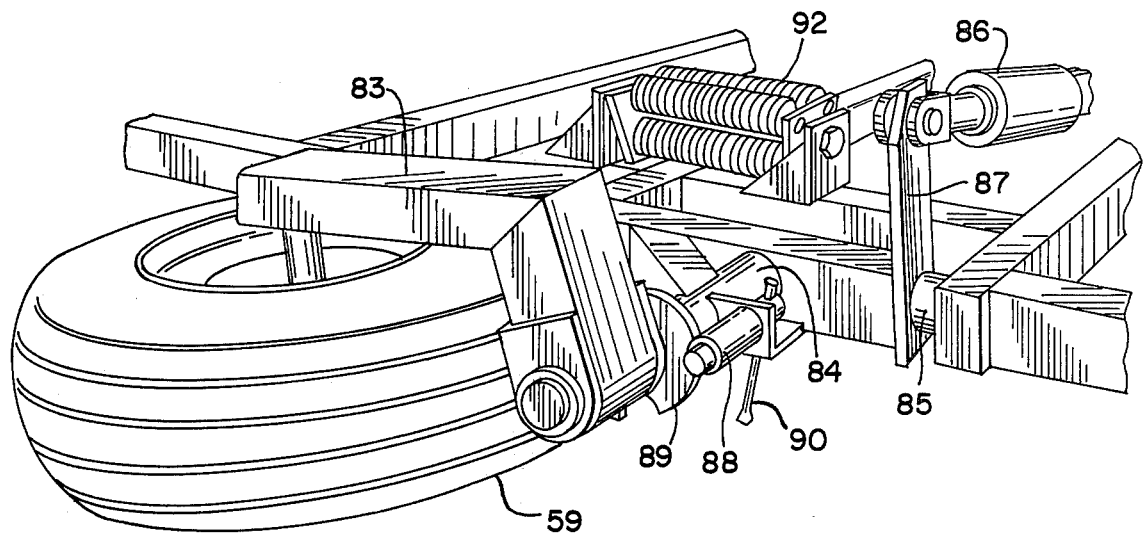
Fig-7-
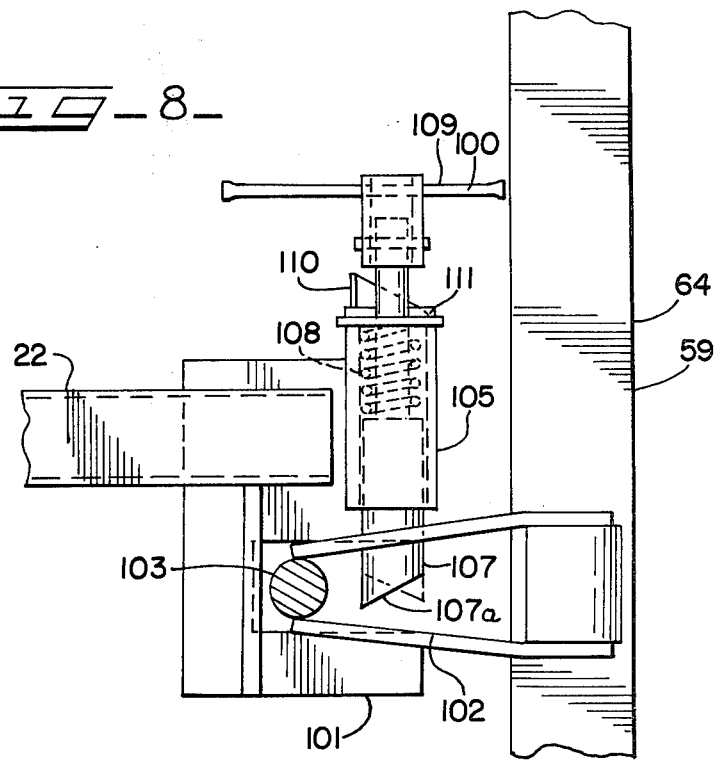
Fig-8-

REARWARDLY FOLDING AGRICULTURAL IMPLEMENT WITH EXTENDABLE TRANSPORT WHEELS

FIELD OF THE INVENTION

This invention pertains to rearwardly folding agricultural implements.

DESCRIPTION OF THE PRIOR ART

A conventional, rearwardly folding agricultural implement utilizes a central subframe which may be a short cart, a center frame moveably supported thereon, and at least a pair of wing frames pivotally connected to the center frame ends by generally horizontal hinges. With the frames aligned transversely in the operating position, the hinges allow the wing frames to "float" over ground irregularities. In a trail type implement gauge wheels are provided under the central subframe and wing frames to control the depth of penetration of the ground working tools which are mounted on the center and wing frames. Implements of this type frequently span 45 feet. Transport of same becomes a problem when acceptable heights and widths are desired. A popular approach is to rotate the center and wing frames to a vertical position and then fold the wings rearwardly about the noted floating hinge axes which are now in a vertical position. The implement is now supported on the central subframe gauge wheels which are located fairly close to the pivotal attachment to a tractor drawbar and the wing wheels which may be forward stabilizing gauge, and transport wheels which are located remote from the pivotal attachment.

In the transport position detailed above, the tools on the center frame, which is now in a vertical position, frequently interfere with the tools on the vertical but rearwardly folded wing frames. Further, the implement cannot be backed up in transport, when needed, due to the flexibility of the wings about the hinges, even when the wings are latched to each other.

SUMMARY OF THE INVENTION

Applicants, as a consequence of the above, designed an implement that avoids the transport problems of the prior art. Specifically, Applicants provide a substantial subframe rather than a short cart and mount the tools thereon. A center frame is utilized as in the past, but same serves mainly to connect and support the wing frames. The center and wing frames in transport are rotated to a vertical position and the wing frames then rotated rearwardly thereabout, as in the past, but the wings are also latched to the subframe. Inasmuch as the subframe is not rotated vertically, the tools thereon cannot interfere with those of the wing frames in the transport position. Further, an extremely rigid structure results and the implement can be backed up in transport as needed.

Because of the resulting rigidity of the lengthy implement in the transport position, special provisions must be provided to provide acceptable handling. The noted wheel positioning of the prior art wherein the central subframe gauge wheels, which are located fairly close to the pivotal attachment to the tractor drawbar, cannot also be satisfactorily used in transport along with the rearwardly located forward stabilizing, gauge and transport wing wheels due the resistance provided by the subframe wheels in turns. Applicants, therefore, have provided a lengthy rearward extension of the subframe and mounted thereon an additional set of extendable transport wheels that are located adjacent the wing wheels when same are in the transport position. The subframe gauge wheels, which are necessary in the operating position, are normally retracted in the transport position. However, the gauge wheels can be extended in transport when passing over surface crests to prevent the tools from contacting the surface. The resulting structure is similar to (but not in loading) a truck semi-trailer and provides similar handling. In turns, the remotely located from the drawbar pivot wing wheels and the adjacent subframe transport wheels allow the rigid implement to pivot thereabout with little resistance. Also (if necessary), by the provision of suitable mounting arrangements, relative motion can be provided between the sets of wing and subframe transport wheels of the lengthy folded implement when traveling over undulating surfaces.

It is, therefore, an object of this invention to provide a new and improved rearwardly folding agricultural implement.

Another object of this invention is to provide an implement that can be backed up in the transport position.

Another object of this invention is to provide an implement having desirable transport handling characteristics.

BRIEF DESCRIPTION OF THE DRAWINGS

FIG. 1 is a partial, plan view of the rearwardly folding agricultural implement of this invention shown in its ground working or operating position;

FIG. 2 is a partial perspective elevational view looking from the left side of the implement (which is located in its operating position) rearwardly from its connection to a tractor (not shown);

FIG. 3 is a perspective elevational view of the right wing gauge, stabilizer, and transport wheel of the implement which is also shown in the operating position;

FIG. 4 is a perspective right side elevational view of an implement wing gauge wheel;

FIG. 6 is a plan view of the implement shown in the transport position with some elements removed;

FIG. 7 is a view of the stabilizer wheel of FIG. 5 ready for use in the transport position; and FIG. 8 is a plan view showing a latched position of a wing to the subframe of the implement in the transport position.

DESCRIPTION OF THE PREFERRED EMBODIMENT

Figure 5:
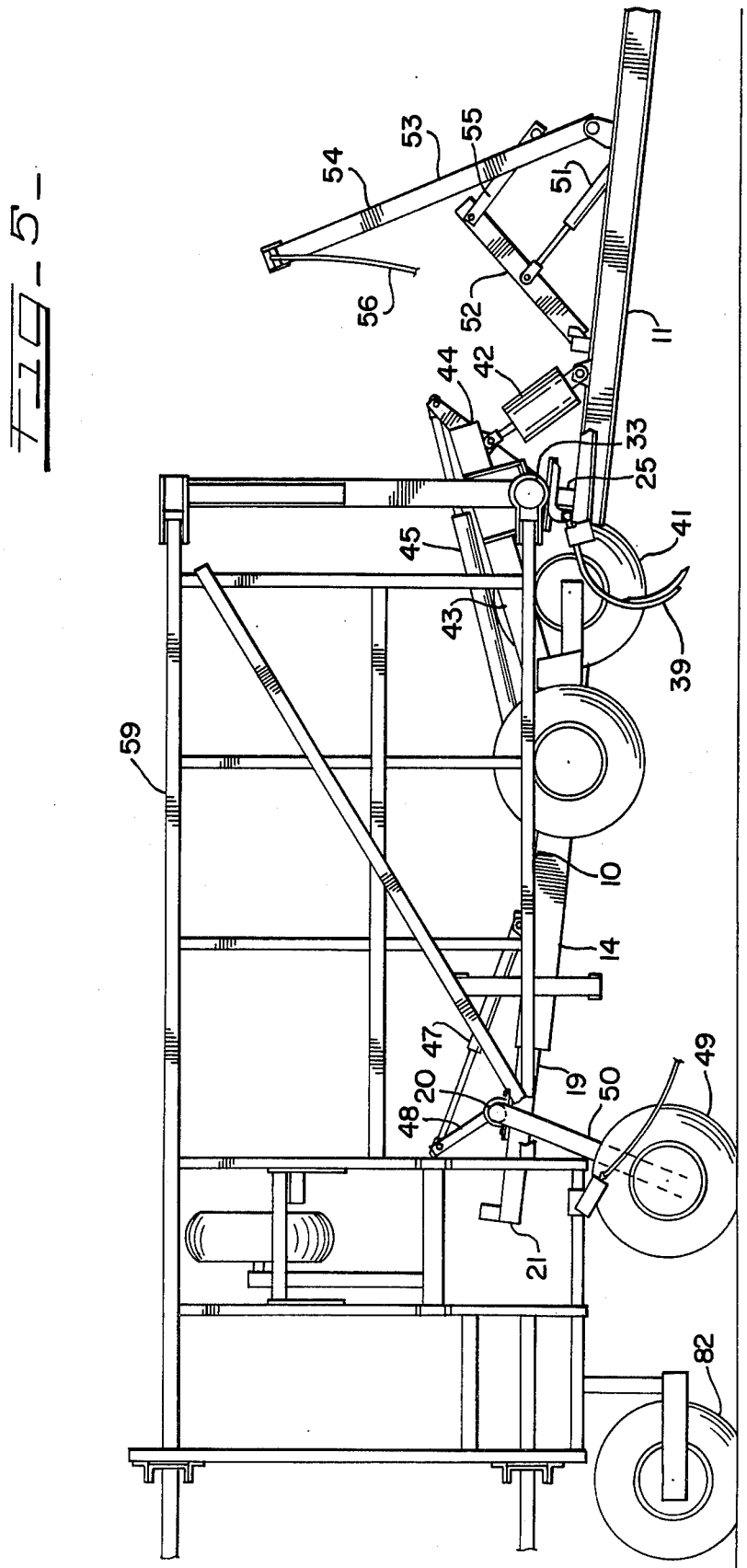
FIG. 5 is a right side elevational view of the implement of this invention in the transport position.

Referring to FIGS. 1, 5, and 6, 10 indicates the implement of this invention. Implement 10 includes an elongated triangular subframe 11 having a forward end with a vertical opening in clevis 12 for attachment via a pin to the drawbar of a tractor (not shown). Subframe 11 also includes inner, rectangular, hollow members 13 and 14 each of which extends forwardly and are joined by plates 16 and 17 which have a plurality of aligned vertically spaced holes for the adjustable mounting of clevis 12 in a conventional manner. Members 13 and 14 diverge rearwardly and form the essential portion of subframe 11. At the rear end of members 13 and 14 are extensions 18 and 19 bolted to 13 and 14 respectively. Extensions 18 and 19 rotatably support tube 20 by suitable bearings. Also a part of subframe 11 and located at the rear end thereof, are spaced structural elements 21, 22, 23, 24 and 25 which are transversely mounted on members 13 and 14 to provide rigidity. They also support agricultural tools, as will later be described, in a laterally spaced arrangement. Similarly longitudinally extending members 26, 27, 28, provide rigidity to the subframe. At the forward end of subframe 11, outside elements 30 and 31 connected at their forward ends to plates 16 and 17 diverge rearwardly where they are joined by transverse member 25 which supports via spaced pedestal bearings, main tube 33. (also see FIG. 2). Forward of member 25 is transverse beam 35 which in addition to providing subframe rigidity supports a lever for the later to be described support cable actuating device. Beam 36 supports the cylinder of the cable assembly. Generally all of the transverse elements 21-25 of subframe 11 support spring loaded agricultural tools as shown schematically by 39 mounted by a suitable clamp on member 22.

Spaced pairs of bogie gauge wheels 40 and 41 provide support for subframe 11 primarily in the working position. These wheels are of non-castering construction. Hydraulic cylinders 42 mounted on elements 30 and 31 via crank 44 pivotally mounted on tube 33 move the trailing arm support 43 to raise or lower the bogie wheels and thus the subframe height to adjust tool depth. It is to be noted that the bogie wheels can also be raised to the transport position shown in FIG. 5. Also, provided are a pair of hydraulic cylinders 45 that are connected to members 13 and 14 and via cranks 46, rigidly to tube 33. Extension of the rod of cylinder 45 rotates tube 33 in crank 44 and moves the attached and later to be described upper center frame and attached wing frames from the horizontal working position of FIG. 2 to an approximately vertical position.

A further, single hydraulic cylinder 47 is provided that is located rearwardly of cylinders 45. This cylinder extends between centrally located member 26 and tube 20 where same is connected thereto by crank 48. Spaced wheels 49, via suitable arms 50 support subframe 11 in the transport position as shown in FIG. 5.

Front cylinder 51 located on beam 36 are connected to lever 52 supported on beam 35 is provided to actuate cable device 53. Cable device 53 also includes tensioning beam 54 which is connected via bifurcated lever 55 to lever 52. When beam 54 is moved forwardly, cable 56 is put under tension and provides transverse rigidity to the implement in the working position.

Implement 10, in addition to the subframe previously described also includes a center upper frame 58 having a first wing frame 59 pivotally attached thereto by hinges 60 as shown best in FIG. 1. Since symmetric, only the right hand portion of implement 10 will be described.

Center frame 58 consists of rear transverse beam 61 and reinforcing elements 62 and 63 which extend therefrom to join tube 33. Due to hinges 60, wing 59 can float upwardly or downwardly in the working position as shown in FIG. 1. Wing 59 also includes front central and rear transverse elements 64, 65, and 66 which support agricultural tools similar to 39 in the same lateral spaced relationship as the subframe. Suitable reinforcing elements provide longitudinal rigidity to wing 59. Cable 56 connects to the forward end of wing 59 to provide added strength in the working position as shown in FIG. 1.

Wing 59 requires a gauge wheel 68 having a trailing arm 69 construction supported on tube 70. Cylinder 71 is mounted on a suitable support and via a crank 72 varies wheel height and thus wing height for proper tool depth. As is conventional, cylinders 42 and 71 are connected in a master slave relationship with phasing capabilities to ensure the same tool depths for subframe 11 and wing 59. Also to be noted is that the wing structure adjacent wheel 68 provides tool support as does the balance of the wing.

Further extending the width of implement 10 and optional for use therewith, is second wing 74. Wing 74, as shown best in FIG. 1, is connected to wing 59 by horizontal hinges 75 and has transverse and longitudinally extending support structure for the three tiers of tools. Gauge wheel 77 has trailing arm 78 mounted on tube 79. Cylinder 80 via crank 81 positions the gauge wheel and is connected in series with cylinder 71. Although not shown, master cylinders 42 are mechanically connected to insure simultaneous operation of the cylinders and thus all of the gauge wheels utilized. Also, to be noted is that the gauge wheel structure for wheel 77 is rigid with the balance of wing 74 and not hinged due to the slight span involved.

An important part of the implement 10 is the front gauge, stabilizing and transport wheel 82 which is shown in detail in FIGS. 3 and 7 and mounted on wing frame 59. Wheel 82 prevents the lowering of the front of the implement due to the loads exerted on the plurality of mounted tools in the operating position. Wheel 82 is pivotally mounted on a shaft portion of arm 83 which also has a shaft portion rotatably mounted in inclined bearing tube 84. Bearing tube 84, via support structure, is rotatably mounted on fixed tube 85. Cylinder 86 mounted on wing 59 has the rod end connected to crank 87 rigidly connected to the structure of bearing tube 84. Cylinder 86 is operated by a separate hydraulic circuit from that connecting the other gauge wheels due to its use also in the transport position. As is apparent, extension of the rod of cylinder 86 will force wheel 82 downwardly thus lifting the wing frame in a gauging function. An adjustable stroke (not shown) is provided to provide varying, as desired, depth control. A spring loaded latch 88 extending between the exterior of tube 84 and notches in collar 89 on the shaft portion locks wheel 83 in the operating position shown in FIG. 3 and in the transport position of FIG. 7. The latch is manually operated by lever 90. Wheel 82 is also manually moved between the noted positions. If desired, suitable provision could be made to automate the design for operation from the tractor seat. From a study of FIGS. 3 and 7, it is apparent that due to the incline of tube 84, that movement of wheel 82 to the transport position requires the extension of the rod of cylinder 86 to lower wheel 82 to a position parallel with wing 59 so same can be supported in its vertical transport position.

Also, shown in FIG. 3 are upper and lower resilient means 92. Means 92 are provided to restrain excessive movement of second wing 74 about hinges 75 in primarily the transport position. Means 92 are located adjacent front hinge 75 and are attached to wing 59 and second wing 74. As best shown in FIG. 3, each means 92 includes bracket 93 connected to wing 74 and bracket 94 connected to wing 59. Plates 96 and 97 are attached to the brackets and to the springs 98 by conventional means. Generally, due to the positioning of the means, each means is placed under tension when the wing 74 moves upwardly or downwardly.

Shown schematically in FIG. 6, and in greater detail in FIG. 8, is latch 100. While latch 100 is preferred, other suitable means could be utilized to inhibit movement about hinges 60. Latch 100 loosely maintains wing 59 to member 22 of subframe 11 in the transport position. Latch 100 includes plate 101 having slot 102 for vertically extending rod 103 attached to element 64 of wing 59. Latch 100 also includes tube 105 welded to plate 101 and closed by a bar except where pin 107 having ramp 107a extends therethrough. Spring 108 biases the pin to the extended position where same traps rod 103 which had moved past ramp 107a. Rotation of handle 109 attached to pin 107 reverses the pin 107 and thus ramp 107a freeing the rod 103 for movement out of the slot. Backing up the implement, will cause the rod 103 to move past the ramp 107a of the pin and out of the slot. Handle 109 is maintained in the latched position by a suitable cam 110 and pin 111 against the spring action.

In operation, with the implement shown as in FIG. 1 in the operating position, wheels 49 are raised and the rod of cylinder 47 is retracted. Thus the implement is supported on bogie wheels 40 and 41, wing wheels 68 and 77 and stabilizer wheels 82. Except for the stabilizer wheels 82, which have their own hydraulic system, gauging is accomplished by a single hydraulic system that includes the cylinders for the noted wheels for desired tool depth. The wings 59 and 74 float about their respective axes to follow the ground contour. Cable 56 provides support for the wings and stabilizing wheels 82 reduce the tendency of the forward part of the implement to move downwardly. For added stability of the large implement, stabilizer wheels having manual height adjustment means may also be provided on the end of each wing 74.

To move to the transport position, all gauge wheels are extended except the stabilizer wheels. This removes the tools from the ground and raises the stabilizer wheels. The stabilizer wheels are now manually pivoted 90° from the position from the position of FIG. 3 and latched thereon by latch 88 which was first released from the latched position with collar 89. The rod of cylinder 86 must now be extended to place wheel 82 parallel to wing 59. Cylinder 51 is now extended to raise beam 54 to release cable tension and the rod of cylinder 47 is extended to lower the wheels 49. The rods of cylinders 40 and 41 are extended and center frame 58 and therefore wings 59 are rotated forwardly approximately 90°. Wings 59 are now supported by stabilizer wheels 82. The implement is now driven forward and the wings 59 move rearwardly on the non-castering wheels 82. Wings 59 encounter subframe member 22 and rods 103 move into slots 102 of latch 100, loosely latching wings 59 to the subframe. Latch 100 being previously set to receive rod 103. The bogie wheels are now retracted as are the wing gauge wheels. The implement is now in the full transport position of FIG. 5. As shown, the implement subframe extends upwardly rearwardly at a slight angle of about 6°. Most of the weight of the implement is now carried on wheels 49 and the adjacent stabilizer wheels 82. The entire implement is preferably rigid with all wheels non-castering, wings latched to the subframe and wings 74 restrained from movement by a resilient means. A certain amount of fore-and-aft flexibility is present due the lengthy nature of the implement. Further, flexibility of this mode can be readily provided if found to be necessary. When traversing curves, it is readily apparent that because wheels 82 and 49 are located extremely remote from the hitch pivot and close coupled, that the implement will perform somewhat similar to a truck semi-trailer combination regarding wheel scuffing although obviously the implement loading differs substantially therefrom. Also, to be noted from FIG. 5 is that if the bogie wheels are lowered, but not to the ground, that they will prevent tool 39 from digging into to a crest of a road.

To move the implement to the working position from the transport position requires a somewhat contrary procedure. The wings are unlatched from latch 100, and the subframe and wing gauge wheels are lowered. The implement is now backed up causing rods 103 to move from the latches and the wings to move to a transverse position. The center frame and wings are now rotated rearwardly to a position generally horizontal to the ground. The cable tension beam 54 is pivoted forwardly and wheels 49 raised. The implement is now in its normal working position but with the stabilizer wheels above the ground in the transport position. Latch 88 is released and wheel 82 pivoted 90° and again latched. The rod of cylinder 86 is now retracted returning wheel 82 to a previously set position. The subframe bogie, and wing gauge wheels are now lowered and the implement is again ready for working as shown in FIG. 1. It should be noted that while only two tools 39, which may be spring loaded chisels, are shown, it is contemplated that the tools are located on all transverse structural members of the wings and subframe in a staggered manner to work all of the soil traversed by the implement.

What is claimed is:

1. In a pull-type ground working implement of the type having a center frame, a pair of wing frames that are adapted to carry ground working tools, with each said wing frame being pivotally connected to an end of said center frame for movement between an operating position wherein said frames are transversely aligned, to a generally vertical position, and then to a transport position in which the wing frames are pivoted rearwardly, wherein the improvement comprises:

a subframe that is adapted to carry ground working tools, said subframe supporting said center frame and having a front end adapted to be connected to a tractor, the other end of said subframe extending rearwardly of said center frame;

a set of operating wheels swingably mounted on said subframe for selective movement to an extended ground engaging position to support the implement in the operating position and to a retracted position for transport;

an operating wheel swingably mounted on each said wing frame for selective movement to a ground engaging position to support the wing frame thereof in the operating position;

a combination operating and transport wheel mounted on each said wing frame to support the wing frame thereof in the operating position and in movement to, and in the transport position;

latch means for latching said wing frames to said subframe in the transport position;

and a set of transport wheels mounted on said subframe rearward of said subframe operating wheels, said subframe transport wheels being swingably mounted for movement from a retracted position during operating, to an extended position for transport, said subframe transport wheels being located generally adjacent said combination wheels in the transport position and providing with said combination wheels the only ground support for said implement in the transport position, thereby resulting in desirable handling characteristics.

2. The implement of claim 1 in which said subframe extends rearwardly of said center frame in the operating position and said subframe transport wheels are mounted thereon adjacent the other end of said subframe.

3. The implement of claim 2 in which said subframe transport wheels are located forwardly of said combination wheels in said transport position.

4. The implement of claim 3 in which said combination wheels are located laterally outwardly of said subframe transport wheels.

5. The implement of claim 4 further comprising latch means for each said combination wheel for latching said combination wheel in the direction of travel in the operating and transport positions.

6. The implement of claim 5 in which said subframe operating wheels are extendable in the transport position to protect the tools.

7. The implement of claim 6 further comprising another wing frame pivotally mounted on each said center frame mounted wing frame and means restraining movement of the another wing frame about each said center frame mounted wing frame in the transport position.

8. The implement of claim 5 in which said means for latching said wing frames to said subframe includes a resiliently mounted latching pin located in a housing, said pin having a ramp surface for contact and movement by a shaft mounted on one of said wing frames as said wing frame moves toward the subframe to the latched position.

9. The implement of claim 8 in which said latching pin is rotatable for latching and unlatching to reverse said ramp, and means for holding said latching pin in a selected position.

* * * * *